M. MOSENG.
ANTISKIDDING DEVICE FOR AUTOMOBILE WHEELS.
APPLICATION FILED OCT. 27, 1913.

1,098,457.

Patented June 2, 1914.

2 SHEETS—SHEET 1.

Witnesses
E. C. Skinkle
A. H. Opsahl

Inventor
Martin Moseng
By his Attorneys
Williamson Merchant

M. MOSENG.
ANTISKIDDING DEVICE FOR AUTOMOBILE WHEELS.
APPLICATION FILED OCT. 27, 1913.

1,098,457.

Patented June 2, 1914.

2 SHEETS—SHEET 2.

Witnesses
E. C. Skinkle
A. H. Opsahl

Inventor
Martin Moseng
By his Attorneys
Williamson Merchant

UNITED STATES PATENT OFFICE.

MARTIN MOSENG, OF MINNEAPOLIS, MINNESOTA.

ANTISKIDDING DEVICE FOR AUTOMOBILE-WHEELS.

1,098,457.  Specification of Letters Patent.  Patented June 2, 1914.

Application filed October 27, 1913. Serial No. 797,459.

*To all whom it may concern:*

Be it known that I, MARTIN MOSENG, a citizen of the United States, residing at Minneapolis, in the county of Hennepin and State of Minnesota, have invented certain new and useful Improvements in Antiskidding Devices for Automobile-Wheels; and I do hereby declare the following to be a full, clear, and exact description of the invention, such as will enable others skilled in the art to which is appertains to make and use the same.

My invention has for its object to provide an improved anti-skidding device, especially adapted for use on automobile wheels, and, to this end, it consists of the novel devices and combinations of devices hereinafter described and defined in the claims.

In the accompanying drawings, which illustrate the invention, like characters indicate like parts throughout the several views.

Figure 2:
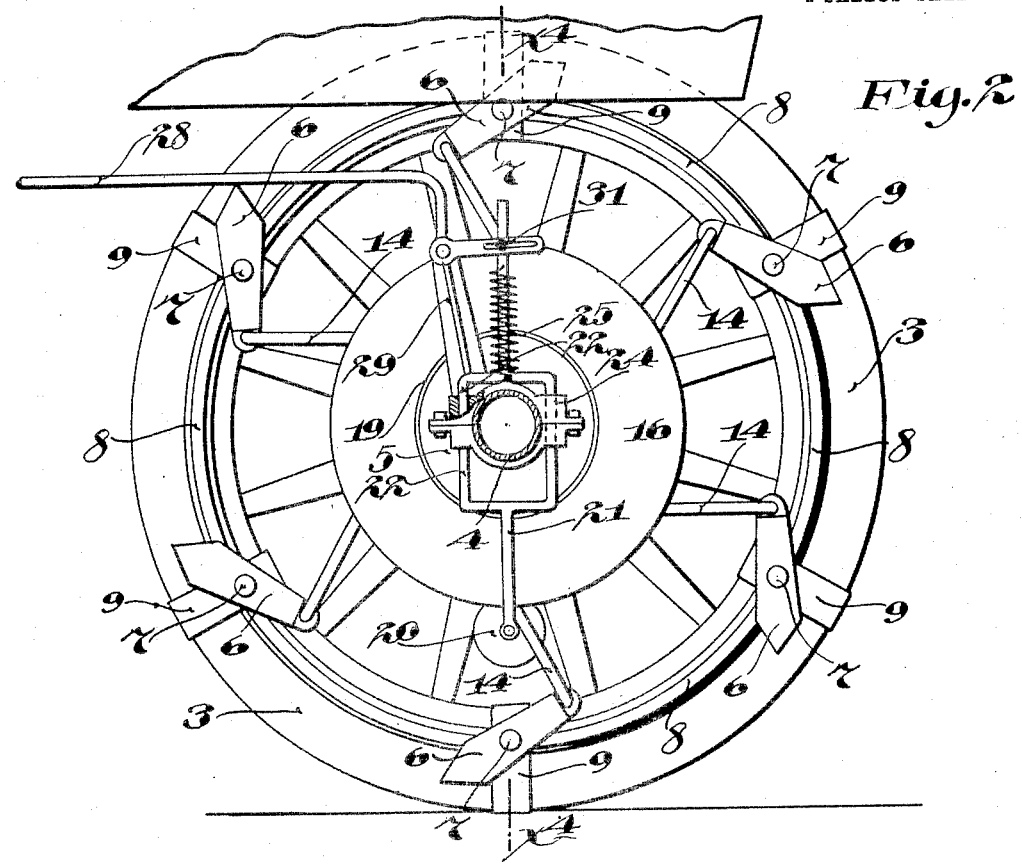
Figure 1:
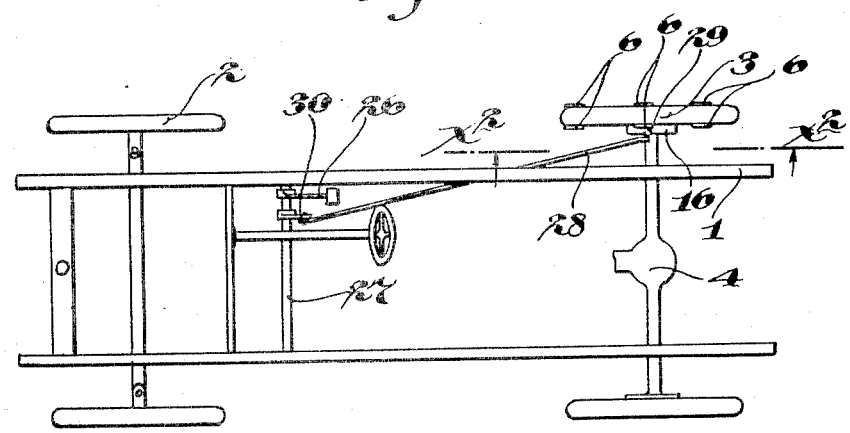
Figure 3:
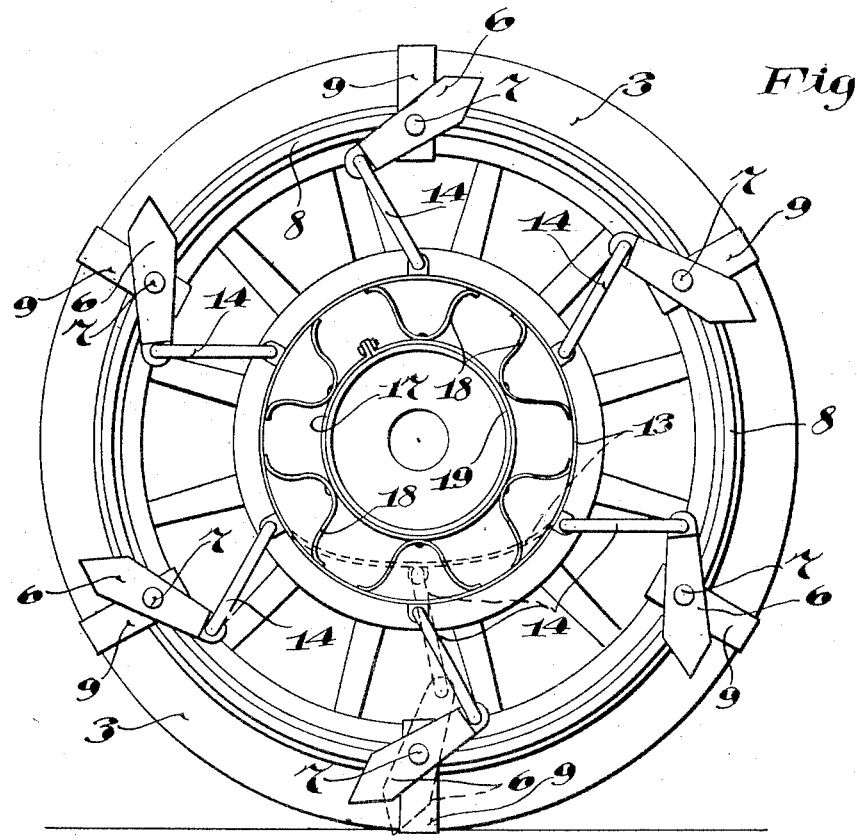
Figure 4:
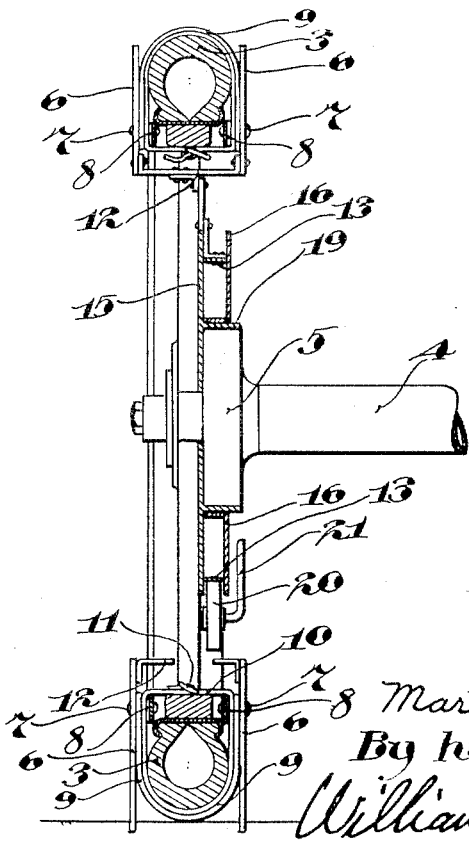

Referring to the drawings, Figure 1 is a plan view of the running gear of an automobile, having incorporated therein the improved anti-skidding device; Fig. 2 is a side elevation of the right hand traction wheel, on an enlarged scale, having the anti-skidding device applied thereto, some parts being sectioned on the line $x^2$ $x^2$ of Fig. 1; Fig. 3 is a view corresponding to Fig. 2, with some parts removed and with other parts shown in different positions by means of dotted lines; and Fig. 4 is a transverse vertical section taken on the line $x^4$ $x^4$ of Fig. 2, some parts being removed and some parts being shown in different positions.

Of the parts of the automobile illustrated for the purpose of this case, it is only necessary to note the frame 1, pneumatic tire equipped front and rear wheels 2 and 3, respectively, rear axle casing 4, and brake drums 5.

Two sets of circumferentially spaced, radially projecting road-bed engaging spurs 6 are intermediately pivoted at 7 to a pair of laterally spaced annular rings 8. These spur carrying rings 8 are located one on each side of the rim of the right hand traction wheel 3, and are connected in pairs by a plurality of circumferentially spaced U-shaped metallic straps 9 which embrace the tread of the tire of said wheel. Rigidly secured to the inner face of each strap 9 is a leather facing 10, the ends of which are extended between the spokes of the wheel and connected by buckles 11. Horizontally extended bars 12 rigidly connect the inner ends of the pairs of spurs 6, and extend between the spokes of the wheel.

The spurs 6 are successively oscillated from inoperative positions, as shown by full lines in the drawings, to operative positions, as indicated by dotted lines in Fig. 3, by a flexible yieldingly centered ring 13, concentrically located with respect to the wheel. Links 14 pivotally connect the inner ends of the spurs 6 to the ring 13. The ring 13 is located between a pair of laterally spaced plates 15 and 16, respectively, and is yieldingly connected to a clamping band 17 by a plurality of semi-elliptical springs 18. The ends of these springs are rigidly secured to the ring 13, and their intermediate portions are rigidly secured to the clamping band 17.

The clamping band 17 is frictionally clamped around a laterally projecting annular flange 19 integrally formed with the plate 15 and telescoped over the adjacent brake drum 5. The plate 15 is rigidly secured to the inner face of the spokes of the wheel, for rotation therewith, and the plate 16 is provided with a central aperture of sufficient diameter to permit said plate to be telescoped onto the annular flange 19. Suitable means, not shown, will be provided for holding the plate 16 in position on the flange 19.

The spurs 6 are successively moved to and from operative positions by distorting the ring 13 at its lowermost point. This is accomplished by a presser wheel 20, over which the periphery of the ring 13 runs. The wheel 20 is loosely journaled on the lower end of a vertically movable bar 21, the intermediate portion of which is expanded to afford an opening 22 which surrounds the casing 4. The side members of the expanded portion of the bar 21 slidably work in vertically extended seats formed in a two-part bearing 24 clamped onto the casing 4 by nut-equipped bolts. A coil spring 25 yieldingly holds the presser wheel 20 out of operative engagement with the ring 13, and is anchored to the upper end of the rod 21 and the bearing 24.

The presser wheel 20 is moved upward into engagement with the ring 13, at will, for the purpose of distorting the same, by a foot lever 26 secured to a rock shaft 27 journaled in the frame 1. A bell crank lever 28, fulcrumed on an arm 29 attached to the bearing 24, connects the rock shaft 27 to the bar 21. The long arm of the lever 28 is pivotally secured to a crank arm 30 on the rock shaft 27, and the short arm thereof is connected to the upper end of the bar 21 by a slot and pin connection 31.

In case the automobile starts to skid, the chauffeur, by operating the foot lever 26, moves the presser wheel 20 upward, thereby distorting the ring 13. As said ring rides over the presser wheel 20, the links 14 are successively moved radially inward, thereby oscillating the connected spurs 6 into a position, as indicated by dotted lines in Fig. 3. In this position of the spurs 6, their points project slightly below the tread of the tire, so as to dig into the road-bed, and thereby stop the skidding of the machine.

It will, of course, be understood that I do not limit myself to the specific details illustrated, but on the contrary, that various changes may be made within the scope of my invention.

What I claim is:—

1. The combination with a vehicle traction wheel, of road-bed engaging spurs, a yieldingly centered ring to which said spurs are connected, and means for distorting said ring, to thereby successively move said spurs to and from operative positions.

2. The combination with a vehicle traction wheel, of road-bed engaging spurs intermediately pivoted to said wheel, a yieldingly centered ring anchored for rotation with said wheel, links connecting said spurs to said ring, and a lever-controlled presser device for distorting said ring, to thereby successively move said spurs to and from operative positions.

3. The combination with a vehicle traction wheel, of road-bed engaging spurs intermediately pivoted to said wheel, a yieldingly centered ring anchored for rotation with said wheel, links connecting said spurs to said ring, a lever-controlled presser wheel for distorting said ring, to thereby successively move said spurs to and from operative positions, and a spring normally holding said presser wheel in an inoperative position.

In testimony whereof I affix my signature in presence of two witnesses.

MARTIN MOSENG.

Witnesses:
F. W. NEBELTHAU,
HARRY D. KILGORE.